(12) United States Patent
Vermani et al.

(10) Patent No.: US 9,991,940 B2
(45) Date of Patent: Jun. 5, 2018

(54) MULTI-USER MULTIPLE-INPUT MULTIPLE-OUTPUT (MU-MIMO) FEEDBACK PROTOCOL

(71) Applicant: QUALCOMM Incorporated, San Diego, CA (US)

(72) Inventors: Sameer Vermani, San Diego, CA (US); Bin Tian, San Diego, CA (US); Rahul Tandra, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/460,485

(22) Filed: Aug. 15, 2014

(65) Prior Publication Data

US 2015/0071272 A1 Mar. 12, 2015

Related U.S. Application Data

(60) Provisional application No. 61/876,031, filed on Sep. 10, 2013.

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0617* (2013.01); *H04B 7/0621* (2013.01);
(Continued)

(58) Field of Classification Search
None
See application file for complete search history.

(56) References Cited

U.S. PATENT DOCUMENTS

2007/0064592 A1* 3/2007 Nakao ................ H04L 25/0206
370/208
2011/0235533 A1* 9/2011 Breit .................... H04B 7/0452
370/252
(Continued)

FOREIGN PATENT DOCUMENTS

| WO | 2011035204 A2 | 3/2011 |
| WO | 2012158961 A1 | 11/2012 |
| WO | 2012169745 A2 | 12/2012 |

OTHER PUBLICATIONS

International Search Report and Written Opinion—PCT/US2014/051466—ISA/EPO—Nov. 28, 2014.
(Continued)

*Primary Examiner* — Christine Duong
(74) *Attorney, Agent, or Firm* — Toler Law Group, PC.

(57) ABSTRACT

In a wireless network having a plurality of devices configured to communicate using a beamforming technique, a method includes sending a trigger packet from a first device of the wireless network to a plurality of second devices of the wireless network. The trigger packet includes trigger data configured to cause the plurality of second devices to perform channel measurement based on the trigger data. The method also includes receiving feedback information from each of the plurality of second devices in response to the trigger packet.

29 Claims, 6 Drawing Sheets

(51) Int. Cl.
*H04L 1/00* (2006.01)
*H04W 72/04* (2009.01)
*H04L 5/00* (2006.01)
*H04L 27/26* (2006.01)

(52) U.S. Cl.
CPC .......... *H04L 1/0026* (2013.01); *H04L 1/0027* (2013.01); *H04L 1/0033* (2013.01); *H04L 5/0048* (2013.01); *H04L 5/0053* (2013.01); *H04L 27/2613* (2013.01); *H04L 5/0007* (2013.01); *H04L 27/261* (2013.01); *H04W 72/046* (2013.01)

(56) References Cited

U.S. PATENT DOCUMENTS

| | | | | |
|---|---|---|---|---|
| 2012/0020243 A1* | 1/2012 | Gong | H04B 7/0452 | 370/254 |
| 2012/0106470 A1* | 5/2012 | Clerckx | H04B 7/0632 | 370/329 |
| 2013/0148644 A1* | 6/2013 | Suh | H04L 5/0048 | 370/338 |
| 2014/0098701 A1* | 4/2014 | Sohn | H04B 7/065 | 370/252 |
| 2014/0199991 A1* | 7/2014 | Mukherjee | H03M 13/6525 | 455/422.1 |
| 2016/0043783 A1* | 2/2016 | Xia | H04B 7/0417 | 370/329 |
| 2016/0072654 A1* | 3/2016 | Choi | H04L 27/2602 | 370/329 |

OTHER PUBLICATIONS

Park M, "IEEE P802.11 Wireless LANs, Specification Framework for TGah", TGah Spec Framework, Intel Corporation, May 14, 2013, pp. 1-76.

* cited by examiner

MULTI-USER MULTIPLE-INPUT MULTIPLE-OUTPUT (MU-MIMO) FEEDBACK PROTOCOL

I. CROSS-REFERENCE TO RELATED APPLICATIONS

The present application claims priority from U.S. Provisional Patent Application No. 61/876,031 filed on Sep. 10, 2013, the contents of which are expressly incorporated by reference in their entirety.

II. FIELD

The present disclosure is generally related to a protocol to communicate feedback information in a multi-user multiple-input multiple-output (MU-MIMO) system.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Various wireless protocols and standards may be available for use by wireless telephones and other wireless devices. For example, Institute of Electrical and Electronics Engineers (IEEE) 802.11, commonly referred to as "Wi-Fi," is a standardized set of wireless local area network (WLAN) communication protocols. Selected Wi-Fi protocols support multi-user multiple-input multiple-output (MU-MIMO) data communication. In MU-MIMO, a sending device can transmit data for multiple receiving devices in a single packet. To improve performance, the data for each receiving device may be beamformed (e.g., via precoding) based on feedback (e.g., channel state) information provided by the receiving device to the sending device.

To acquire the feedback information, the sending device may use a sounding protocol that involves polling each receiving device individually for the feedback information. For example, the sending device may transmit an announcement packet that identifies receiving devices. After performing channel measurement, the first identified receiving device may send a first feedback packet to the sending device. After the sending device receives the first feedback packet, the sending device may send a polling packet to a second receiving device, which causes the second receiving device to send a second feedback packet to the sending device. This polling packet-feedback packet cycle may continue for each additional receiving device until feedback packets from all identified receiving devices have been received by the sending device. Moreover, the feedback acquisition process may be repeated frequently (e.g., once every 10 or 20 milliseconds).

IV. SUMMARY

High Efficiency Wi-Fi (HEW) is an IEEE 802.11 study group (SG) to explore potential updates and revisions to Wi-Fi standards to improve efficiency and operational performance in certain use cases. HEW may support MU-MIMO data communication. However, the sounding protocol used in other Wi-Fi standards, which involves polling receiving devices individually for feedback information, may not be suitable (e.g., may be inefficient) for HEW.

The present disclosure presents an improved protocol for receiving feedback information in a MU-MIMO system. Instead of polling devices individually, a first device of a wireless network (e.g., an access point) may append trigger data to a packet that is sent to one or more second devices of the wireless network (e.g., mobile stations). The wireless network may include multiple devices configured to communicate using a beamforming technique. The first device may be configured to operate as a "beamformer" and the second devices may be configured to operate as "beamformees." As used herein, a beamformer is a device that is configured to use beamforming techniques (e.g., precoding) to generate and transmit a packet to multiple receiving devices such that when each receiving device decodes/processes the packet, data intended for the receiving device has a first power level and data intended for other receiving devices has a second power level that is lower than the first power level. A beamformee is a receiving device that is configured to receive and to decode/process a beamformed packet received from a beamformer. It should be noted that the distinction between beamformers and beamformees is not to be considered limiting. Particular devices in a wireless network may be capable of acting as beamformers as well as beamformees. In one example, the trigger data includes one or more non-precoded (e.g., non-beamformed) long training fields (LTFs) that are appended to the end of a MU-MIMO packet. Because the trigger data is not precoded/beamformed, the trigger data may cause all mobile stations receiving the packet to perform channel estimation, including mobile stations that are not the intended recipients of the beamformed MU-MIMO data in the packet.

A mobile station may provide feedback information to the access point when the mobile station has data to send the access point and/or when the mobile station determines that channel conditions have sufficiently changed as compared to a previous feedback report. If needed, the access point can request feedback information from individual mobile stations. In some implementations, mobile stations may piggyback the feedback information to a data or an acknowledgement packet when the channel conditions have sufficiently changed.

In a particular embodiment, a method includes, in a wireless network having a plurality of devices configured to communicate using a beamforming technique, sending a trigger packet from a first device of the wireless network to a plurality of second devices of the wireless network. The trigger packet includes trigger data configured to cause the plurality of second devices to perform channel measurement based on the trigger data. The method also includes receiving feedback information from each of the plurality of second devices in response to the trigger packet.

In another particular embodiment, a method includes receiving, at a second device of a wireless network a trigger packet from a first device of the wireless network. The wireless network includes a plurality of devices configured to communicate using a beamforming technique. The method also includes performing channel measurement in response to receiving the trigger packet, where the channel measurement is performed based on trigger data included in the trigger packet. The method further includes sending a feedback report to the first device, where the feedback report includes feedback information based on the channel measurement.

In another particular embodiment, a method includes sending, via a wireless network having a plurality of devices configured to communicate using a beamforming technique, a packet from a first device of the wireless network to a second device of the wireless network. The packet includes at least one long training field (LTF) that follows a data portion of the packet.

In another particular embodiment, a method includes, in a wireless network having a plurality of devices configured to communicate using a beamforming technique, generating and sending an acknowledgement (ACK) packet from a second device of the wireless network to a first device of the wireless network. The ACK packet includes feedback information that is useable to precode data for beamformed transmission to the second device.

One particular advantage provided by at least one of the disclosed embodiments is a protocol that enables a first device (e.g., an access point) to acquire feedback information from multiple other devices (e.g., mobile stations) without individually polling the other devices. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
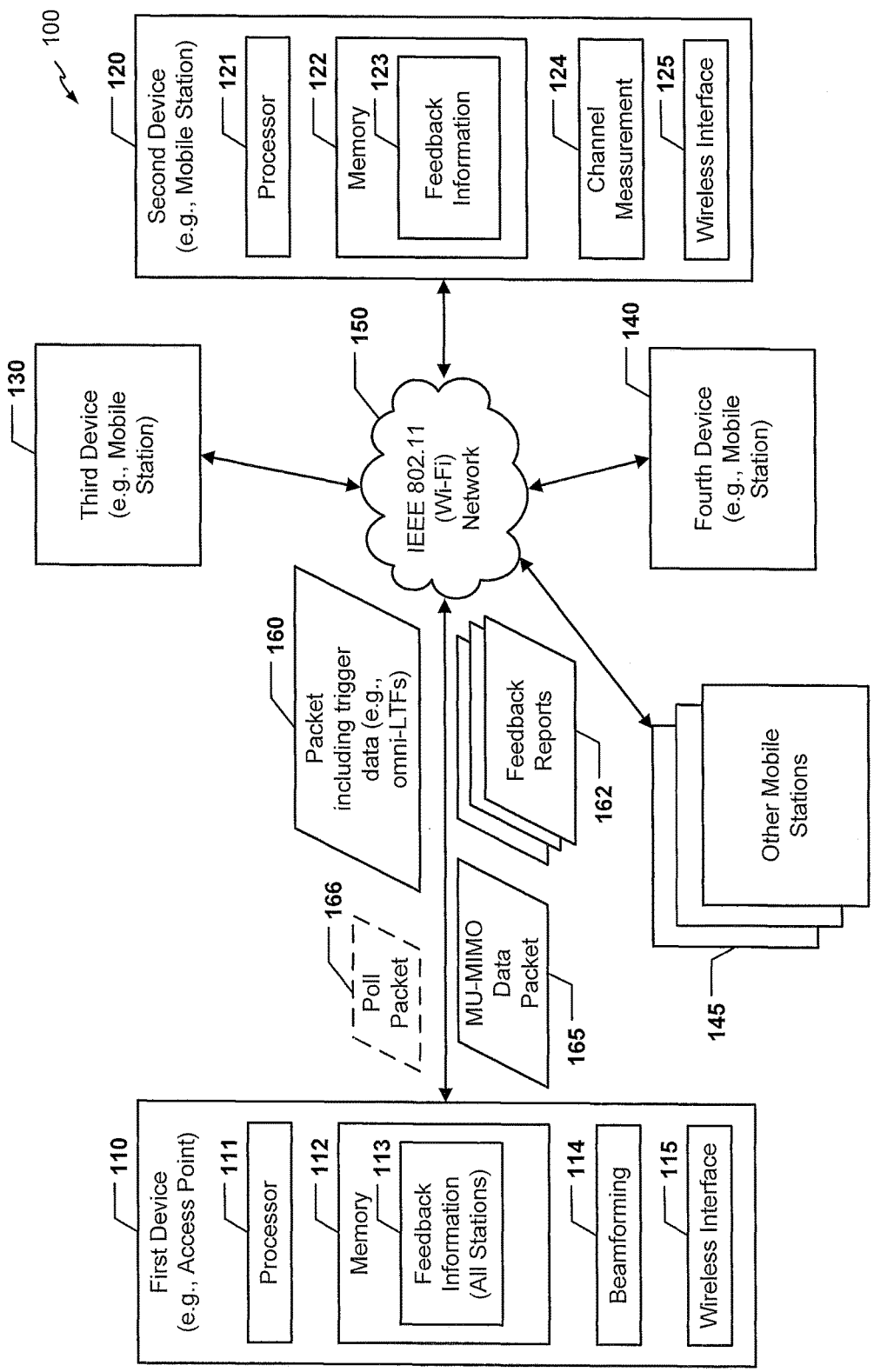
FIG. 1 is a diagram to illustrate a particular embodiment of a multi-user multiple-input multiple-output (MU-MIMO) system that is operable to communicate feedback information.

Referring to FIG. 1, a multi-user multiple-input multiple-output (MU-MIMO) system that is operable to communicate feedback information is shown and generally designated 100. The system 100 includes a first device (e.g., an access point) 110 configured to wirelessly communicate with a plurality of mobile devices (e.g., mobile stations (STAs)) 120, 130, and 140 via a wireless network 150. The wireless network 150 may include and/or be coupled to a plurality of devices (e.g., the devices 110, 120, 130, and 140) that are configured to communicate using a beamforming technique. In a particular embodiment, the first device 110 may be a beamformer and the devices 120, 130, and 140 may be beamformees. As used herein, a beamformer is a device that is configured to use beamforming techniques (e.g., precoding) to generate and transmit a packet to multiple receiving devices such that when each receiving device decodes/processes the packet, data intended for the receiving device has a first power level and data intended for other receiving devices has a second power level that is lower than the first power level. A beamformee is a receiving device that is configured to receive and to decode/process a beamformed packet received from a beamformer. In alternate embodiments, a different number of beamformers and beamformees may be present in the system 100. It should be noted that the distinction between beamformers and beamformees is not to be considered limiting. Particular devices in a wireless network may be capable of acting as beamformers (e.g., sending beamformed data) as well as beamformees (e.g., receiving beamformed data).

In a particular embodiment, the wireless network 150 is an Institute of Electrical and Electronics Engineers (IEEE) 802.11 wireless network (e.g., a Wi-Fi network). For example, the wireless network 150 may operate in accordance with an IEEE 802.11 standard. In an illustrative embodiment, the wireless network 150 is an 802.11 high efficiency Wi-Fi (HEW) network. The wireless network 150 supports MU-MIMO data transmission in both uplink (UL) and downlink (DL) directions. As used herein, UL communication refers to STA-to-AP communication, and DL communication refers to AP-to-STA communication. In a particular embodiment, the wireless network 150 also supports UL and DL multiple access communication. For example, the wireless network 150 may support UL and DL orthogonal frequency-division multiple access (OFDMA) communication.

In a particular embodiment, the first device 110 includes a processor 111 (e.g., a central processing unit (CPU), a digital signal processor (DSP), a network processing unit (NPU), etc.), a memory 112 (e.g., a random access memory (RAM), a read-only memory (ROM), etc.), and a wireless interface 115 configured to send and receive data via the wireless network 150. The memory 112 may store feedback information 113 (e.g., channel state information) received from one or more stations within range of the first device 110. The feedback information 113 may be used by a beamforming module 114 to derive a precoding matrix and to precode a MU-MIMO packet (or portions thereof) using the precoding matrix prior to sending the MU-MIMO packet to a group of stations.

The devices 120, 130, and 140, as well as other mobile stations 145 in the system 100, may each include a processor (e.g., a processor 121), a memory (e.g., a memory 122), a channel measurement module (e.g., a channel measurement module 124), and a wireless interface (e.g., a wireless interface 125). The channel measurement module 124 may be configured to determine feedback information 123 (e.g., channel state information). The feedback information 123 may be stored in the memory 122, as shown.

During operation, MU-MIMO communication may occur between the first device 110 and one or more groups of receiving devices. For example, the devices 120, 130, and 140 may be part of a particular beamforming group. The other mobile stations 145 may not be in a beamforming group. The first device 110 may transmit a MU-MIMO data packet 165 to the devices 120, 130, and 140. The MU-MIMO data packet 165 may include precoded data for each device 120, 130, and 140 of the beamforming group. For example, during decoding/processing of the MU-MIMO data packet 165, the second device 120 may detect stronger signals corresponding to the portions of the packet 165 that are precoded for the second device 120. The second device 120 may detect weaker signals corresponding to portions of the packet 165 that are precoded for other devices of the beamforming group.

To determine the precoding matrix to use in precoding the MU-MIMO data packet 165, the first device 110 may transmit a trigger packet 160 that includes trigger data. The trigger data may cause a receiving station to perform channel measurement. In one example, the trigger data includes one or more omni long training fields (omni-LTFs) that are not precoded. Because the omni-LTFs are not precoded, the omni-LTFs can be decoded/processed by the other stations 145 as well as the receiving devices 120, 130, and 140. In a particular embodiment, the trigger packet 160 is a MU-MIMO packet, as described with reference to FIG. 2. In another particular embodiment, the trigger packet 160 is a clear to transmit (CTX) packet, as further described with reference to FIG. 3. In alternate embodiments, the trigger data may be transmitted in other types of packets. In a particular embodiment, the trigger data may be transmitted intermittently by the first device 110. Alternately, the trigger data may be transmitted by the first device 110 in response to determining that MU-MIMO data is to be sent to a group of receiving devices.

In response to receiving the trigger packet 160, one or more of the devices 120, 130, 140 and the other stations 145 may perform channel measurement (e.g., channel estimation). The omni-LTF(s) may be used during the channel measurement process. Each device/station may provide feedback information to the first device 110 in a feedback report 162. In a particular embodiment, only those stations that are part of at least one beamforming group provide a feedback report 162 to the first device 110. In another particular embodiment, only those stations that will be sent MU-MIMO data provide a feedback report 162. For example, the trigger packet 160 may be a first MU-MIMO data packet that includes data for each of the devices 120, 130, and 140 of the beamforming group. The first MU-MIMO data packet may also indicate that additional data (e.g., data that will be included in the subsequent MU-MIMO data packet 165) exists for the devices 120 and 130, but not for the device 140. In response, the devices 120 and 130 may provide a feedback report to the first device 110, but the device 140 may not provide a feedback report to the first device 110.

In a particular embodiment, a station provides a feedback report as part of a single acknowledgement (ACK) packet, as further described with reference to FIG. 2. In an alternate embodiment, multiple stations provide feedback reports in a single UL OFDMA or UL MU-MIMO data or ACK packet, as further described with reference to FIG. 3. In other embodiments, feedback reports may be provided in other types of packets.

In a particular embodiment, the feedback reports 162 are differential feedback reports that do not include complete feedback information. Instead, to save space, the differential feedback reports include delta (e.g., change) information with respect to a previously transmitted feedback report. In a particular embodiment, a station does not provide feedback information unless the feedback information has sufficiently changed with respect to the previous feedback report (e.g., the delta information exceeds a threshold). In one example, the threshold may be a mean square error (MSE) threshold.

It should be noted that multiple feedback reporting conditions may be combined. For example, a station may not provide a feedback report in response to receiving omni-LTFs unless additional data is forthcoming for the station and the feedback delta information exceeds a threshold.

In a particular embodiment, the first device 110 may also have the ability to poll an individual station for feedback information. For example, the first device 110 may transmit a poll packet 166 to a particular station. In response to receiving the poll packet 166, the particular station may provide the feedback report 162 to the first device 110.

In a particular embodiment, the trigger packet 160 may identify that the first device 110 is the source of the trigger packet 160. By including an identifier of its source, the trigger packet 160 may prevent stations that are not associated with the first device 110 from performing unnecessary channel measurement operations. In one example, a High-Efficiency Wi-Fi signal (HEW-SIG) field of the trigger packet 160 identifies the first device 110 (e.g., by media access control (MAC) address, basic service set identifier (BSSID), another identifier, etc.).

After receiving the feedback report(s) 162, the first device 110 may store the feedback information included in the feedback report(s) 162 as the feedback information 113. The first device 110 may also derive and use a precoding (e.g., beamforming) matrix to generate the MU-MIMO data packet 165. For example, the first device 110 may use feedback information provided by the devices 120, 130, and 140 in generating the MU-MIMO data packet 165. The first device 110 may transmit the MU-MIMO data packet 165 to the devices 120, 130, and 140. The first device 110 may continue to use the same precoding matrix until updated feedback information is received from any of the devices 120, 130, or 140. As described above, such updated feedback information may be received on an as-needed basis.

The system 100 of FIG. 1 thus illustrates acquisition of feedback information without polling exchanges between the first device 110 and the individual devices 120, 130, and 140. Further, the trigger data (e.g., omni-LTFs) included in the trigger packet 160 may also cause stations that are not members of a beamforming group (e.g., the mobile stations 145) to perform channel measurement. If such a station joins a beamforming group in the future, the station can provide a feedback report to the first device 110 without the first device having to request the station to perform channel measurement. The system 100 of FIG. 1 may thus decrease messaging overhead and wireless medium congestion associated with acquiring feedback information for MU-MIMO communication.

Figure 2:
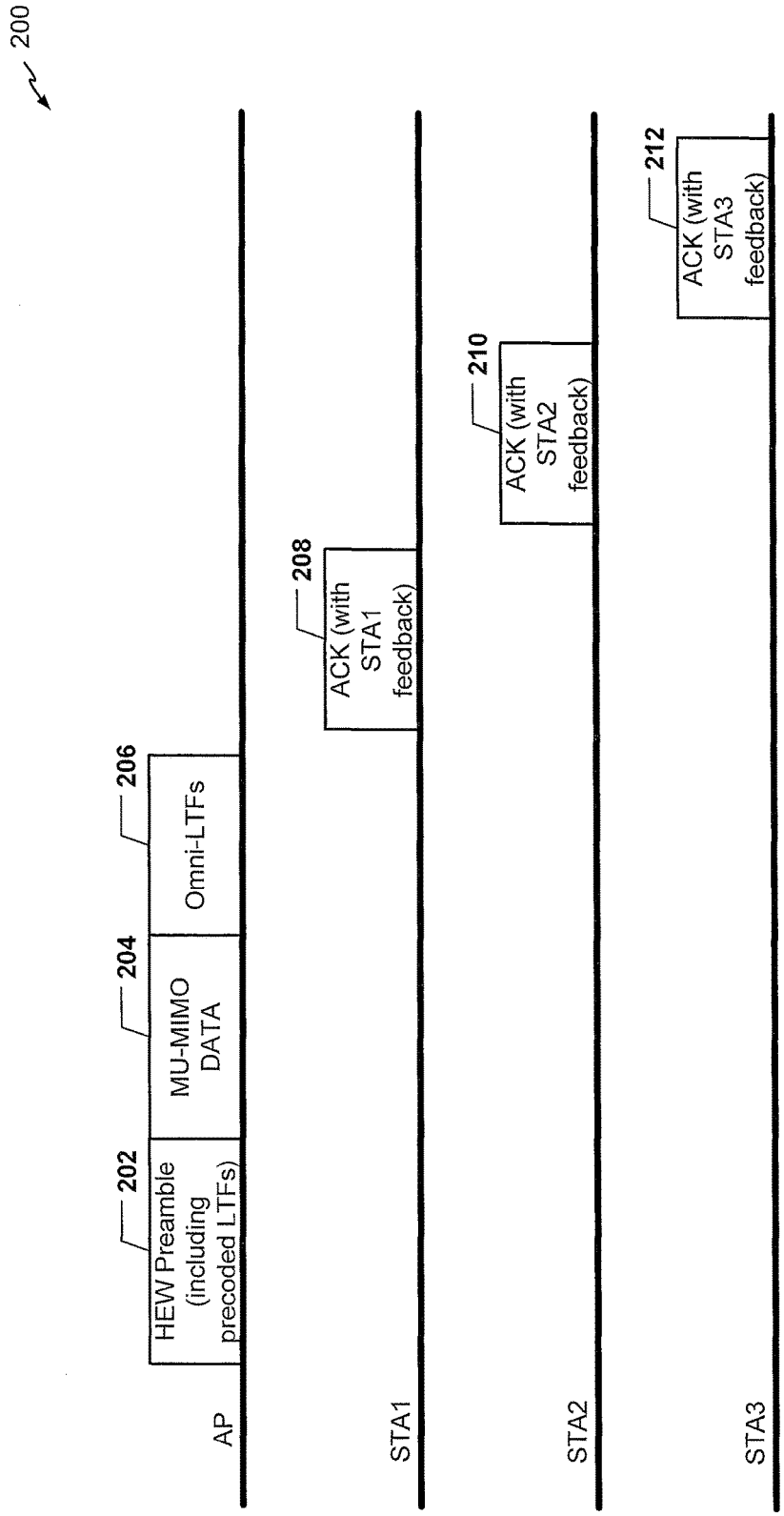
FIG. 2 is a timing diagram to illustrate an example of transmitting non-precoded long training fields at the end of a packet.

FIG. 2 is a timing diagram to illustrate an example of transmitting omni-LTFs at the end of a packet and is generally designated 200. In FIG. 2, a horizontal axis from left-to-right corresponds to time.

As shown in FIG. 2, an AP (e.g., the first device 110 of FIG. 1) may transmit a packet to a plurality of mobile stations (e.g., mobile stations designated "STA1," "STA2," and "STA3"). The packet may be a HEW packet that includes a HEW preamble 202, MU-MIMO data 204, and one or more omni-LTFs following the MU-MIMO data. In a particular embodiment, the HEW preamble 202 includes one or more legacy fields that are not precoded. For example, the HEW preamble 202 may include a legacy short training field (L-STF), a legacy long training field (L-LTF), and a legacy signal (L-SIG) field. The L-STF, L-LTF, and L-SIG fields may collectively be referred to as a legacy preamble. In a particular embodiment, the legacy preamble enables legacy devices (e.g., non-HEW devices) to detect the packet, even though the legacy devices may be unable to process portions of the packet that follow the legacy preamble. Examples of legacy devices may include, but are not limited to, IEEE 802.11 a/b/g/n/ac devices. Even though the legacy devices may not be able to process portions of the packet that follow the legacy preamble, the legacy preamble may be used to prevent the legacy devices from congesting a wireless medium during the duration of the packet. For example, the legacy preamble may include a duration field, and the legacy devices may refrain from congesting the medium for the duration indicated by the duration field.

The HEW preamble 202 may also include fields that are precoded for STA1, STA2, or STA3. For example, the HEW preamble 202 may include precoded LTFs that can be used by STA1, STA2, and STA3 to decode corresponding portions of the precoded MU-MIMO data 204.

In a particular embodiment, the HEW preamble 202 indicates that the omni-LTFs 206 follow the MU-MIMO data. 204. For example, the HEW preamble 202 may indicate how many omni-LTFs 206 follow the MU-MIMO data 204. Alternately, a wireless standard or protocol (e.g., an IEEE 802.11 standard or protocol) may require that omni-LTF(s) follow MU-MIMO data in certain types of packets. The HEW preamble 202 may also identify a source of the packet (e.g., may include an identifier of the AP) and identify the intended recipients of the packet (e.g., STA1, STA2, and STA3), as described with reference to FIG. 1.

Upon receiving the omni-LTFs 206, the receiving stations STA1, STA2, and STA3 may perform channel measurement and/or transmit feedback information to the AP. In the example of FIG. 2, each of the stations includes the feedback information in an ACK packet 208, 210, and 212, respectively. In one example, the feedback information is differential feedback information, as described with reference to FIG. 1. It should be noted that although FIG. 2 illustrates that all three of the stations provide feedback information, this is for example only. In some embodiments, a station provides feedback information if one or more conditions are satisfied (e.g., when the HEW preamble 202 indicates that additional data is forthcoming for the station and the channel state information as sufficiently changed since a previous feedback report). In a particular embodiment, the stations STA1, STA2, and STA3 avoid collisions in transmitting the ACK packets 208, 210, 212 by using a collision avoidance mechanism (e.g., a request to send/clear to send mechanism or some other mechanism). In a particular embodiment, an order in which stations of a MU-MIMO group provide feedback reports is determined by data included in the trigger packet. For example, a SIG field (e.g., included in the HEW preamble 202) may include a group identifier (GID) (e.g., a GID of 6). The stations in the MU-MIMO group (e.g., STA1, STA2, and STA3) may determine in what order they are to provide feedback reports based on the GID. To illustrate, based on the GID being equal to 6, the stations may determine that the order of feedback (e.g., their relative ordering in the MU-MIMO group) is STA1, then STA2, and then STA3.

In a particular embodiment, one or More STFs may be included after the MU-MIMO data 204 and before the omni-LTFs 206. For example, the STF(s) may provide an increase receiver gain at the stations STA1, STA2, and STA3. It should be noted that although FIG. 2 illustrates that the omni-LTFs 206 are appended to the end of a packet, in alternate embodiments the omni-LTFs may be included in another portion of a packet.

Figure 3:
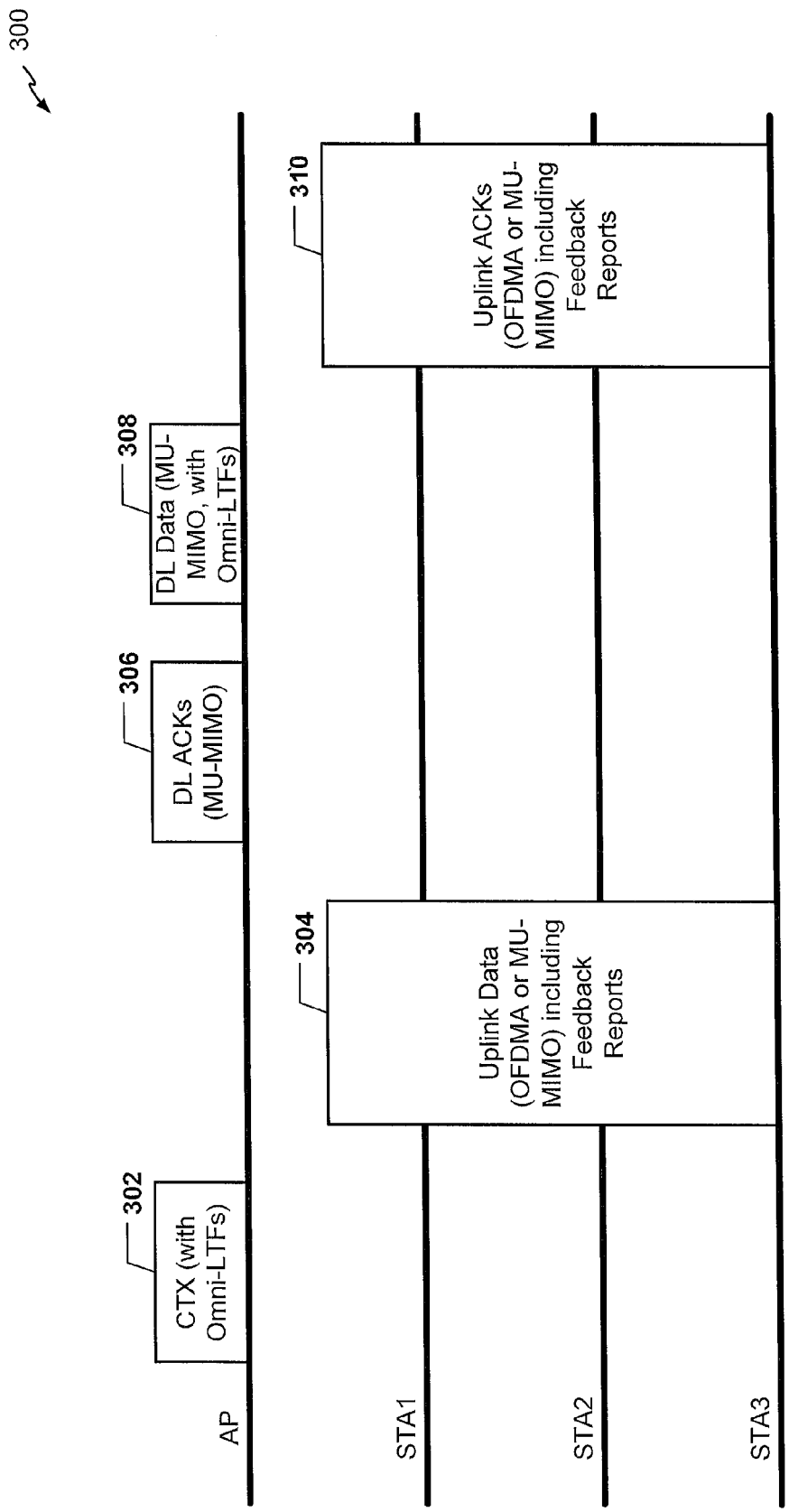
FIG. 3 is a timing diagram to illustrate another example of transmitting non-precoded long training fields.

FIG. 3 is a timing diagram to illustrate another example of transmitting omni-LTFs and is generally designated 300. In FIG. 3, a horizontal axis from left-to-right corresponds to time.

As shown in FIG. 3, the AP may transmit a clear to transmit (CTX) packet 302 to the stations STA1, STA2, and STA3. The CTX packet 302 may include one or more omni LTFs. The CTX packet 302 may be sent by the AP to indicate to the stations STA1, STA2, and STA3 that a wireless medium is available for the transmission of uplink (UL) data.

In response to the CTX packet 302, the stations STA1, STA2, and STA3 may send UL data 304 to the station. The UL data 304 from each station may be multiplexed together, as shown. For example, the UL data 304 may be sent using OFDMA packet(s) and/or UL MU-MIMO packet(s). The UL data 304 may also include feedback reports from one or more of the stations.

Upon receiving the UL data 304, the AP may send downlink (DL) ACKs 306 to the stations. In a particular embodiment, the DL ACKs are sent using DL MU-MIMO packet(s). The AP may also send DL data 308 to the stations, where the DL data is precoded for each individual station based on the feedback report(s) included in the UL data 304. For example, the DL data 308 may be sent using DL MU-MIMO packet(s) that include omni-LTFs, such as the omni LTFs 206 of FIG. 2.

In response to receiving the DL data 308, the stations may transmit UL ACKs 310. In a particular embodiment, the UL ACKs are transmitted using OFDMA and/or UL MU-MIMO packet(s) and include feedback reports based on the omni-LTFs included with the DL data 308.

FIGS. 2-3 thus illustrate embodiments of acquiring feedback information without having to poll individual stations for the feedback information. The feedback information may be "piggybacked" onto (e.g., included in) various types of packets, such as ACK packets and data packets. The omni-LTFs may be included at the end of a packet or in another part of the packet (e.g., an "omni" part of the preamble that includes other non-precoded fields, such as legacy fields). Repeated MU-MIMO transmissions with respect to the same group of stations may be performed without carrying out a polling cycle for feedback information every 10-20 milliseconds.

It should be noted that various other embodiments of acquiring feedback information may be implemented in accordance with the disclosure. For example, a device (e.g., an access point) may periodically put omni-LTFs (or other trigger data) into beacon frames. As another example, stations may include feedback information in power-save (PS) poll frames. In a particular embodiment, when the composition of a particular beamforming group (e.g., group of stations) changes or a new beamforming group is formed, the device may select a conservative modulation and coding scheme (MCS) to use during an initial transmission. The device may also use existing (e.g., previously received) feedback information from stations in the changed/new beamforming group when the existing feedback information is sufficiently new (e.g., was received within a threshold time period).

Figure 4:
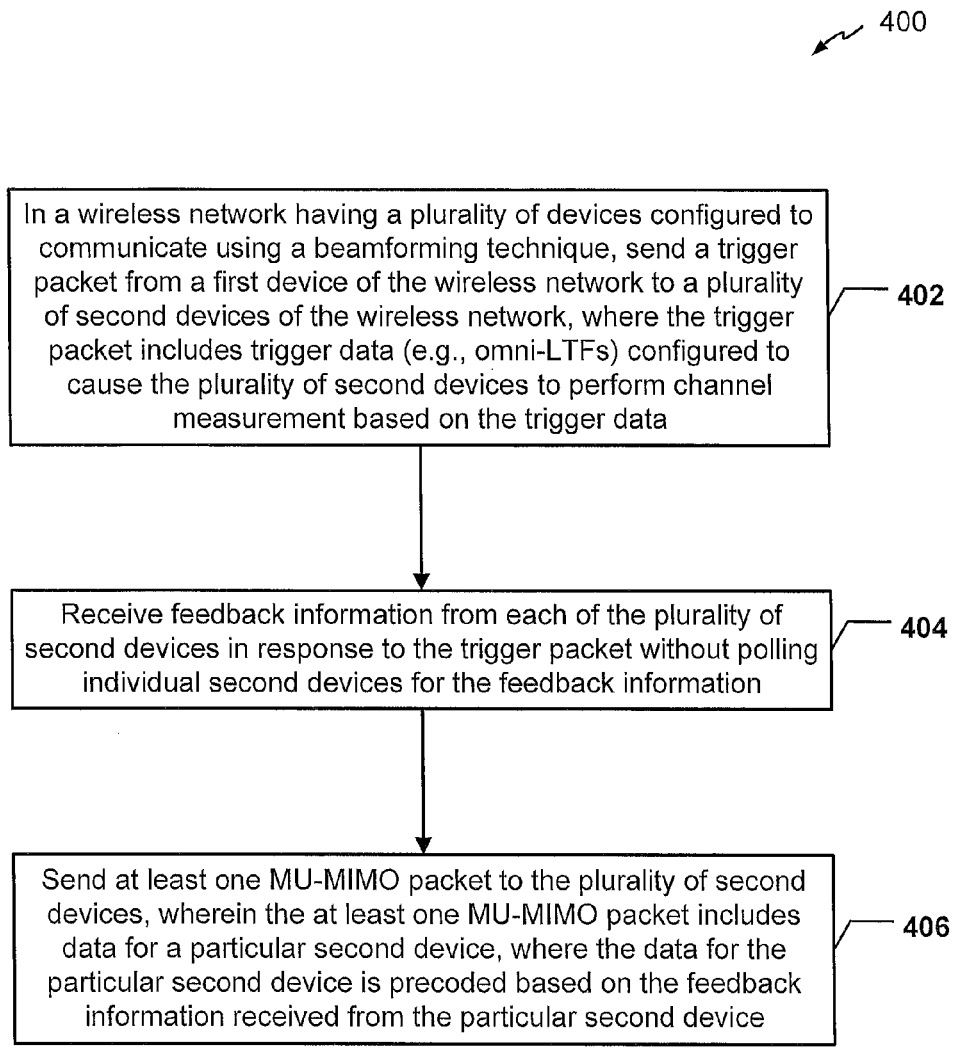
FIG. 4 is a flowchart to illustrate a particular embodiment of a method of operation at a device configured to transmit data using a beamforming technique.

FIG. 4 is a flowchart to illustrate a particular embodiment of a method 400 of operation at a device configured to transmit data using a beamforming technique. In an illustrative embodiment, the method 400 may be performed by the first device 110 of FIG. 1.

The method 400 may include, in a wireless network having a plurality of devices configured to communicate using a beamforming technique sending a trigger packet from a first device of the wireless network to a plurality of second devices of the wireless network, at 402. The trigger packet may include trigger data (e.g., omni-LTFs) configured to cause the plurality of second devices to perform channel measurement based on the trigger data. For example, in FIG. 1, the first device 110 may transmit the trigger packet 160 to devices 120, 130, and 140.

The method 400 may also include receiving feedback information from each of the plurality of second devices in response to the trigger packet, at 404. The feedback information may be received without polling individual second devices for the feedback information. For example, in FIG. 1, the first device 110 may receive the feedback reports 162 from the devices 120, 130, and 140.

The method 400 may further include sending at least one MU-MIMO packet to the plurality of second devices, at 406. The at least one MU-MIMO packet may include data for a particular second device, where the data for the particular second device is precoded based on the feedback information received from the particular second device. For example, in FIG. 1, the first device 110 may send the MU-MIMO data packet 165 to the devices 120, 130, and 140.

Figure 5:
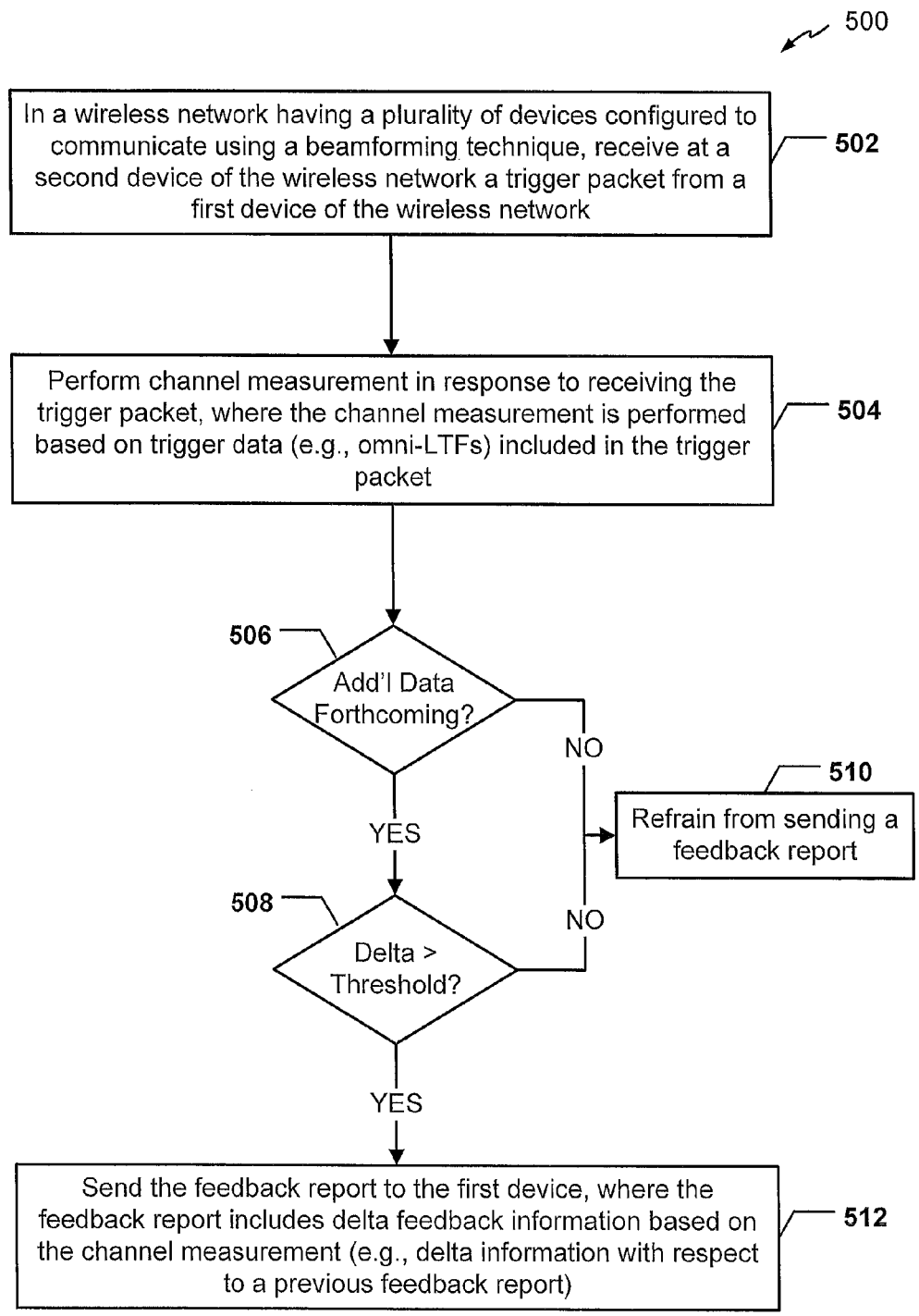
FIG. 5 is a flowchart to illustrate a particular embodiment of a method of operation at a device configured to receive data using a beamforming technique.

FIG. 5 is a flowchart to illustrate a particular embodiment of a method 500 of operation at a device configured to receive data using a beamforming technique. In an illustrative embodiment, the method 500 may be performed by the second device 120 of FIG. 1.

The method 500 may include in a wireless network having a plurality of devices configured to communicate using a beamforming technique, receiving at a second device of the wireless network a trigger packet from a first device of the wireless network, at 502. For example, in FIG. 1, the second device 120 may receive the trigger packet 160 from the first device 110.

The method 500 may also include performing channel measurement in response to receiving the trigger packet, at 504. The channel measurement may be performed based on trigger data (e.g., omni-LTFs) included in the trigger packet. For example, in FIG. 1, the second device 120 may perform channel measurement based on omni-LTFs included in the trigger packet 160.

The method 500 may further include determining whether additional data for the second device is forthcoming from the first device, at 506. If additional data is forthcoming, the method 500 may include determining whether feedback delta (e.g., a change in channel state since a previous feedback report) is greater than a threshold, at 508. If additional data is not forthcoming or if the feedback delta is not greater than the threshold, the method 500 may include refraining from sending a feedback report to the first device, at 510.

If additional data is forthcoming and if the feedback delta is greater than the threshold, the method may include sending the feedback report to the first device, at 512. The feedback report may include the feedback delta. For example, in FIG. 1, the second device 120 may send the feedback report 162 to the first device 110.

It should be noted that the order of steps illustrated in FIGS. 4-5 is for illustrative purposes only, and is not to be considered limiting. In alternative embodiments, certain steps may be performed in a different order and/or may be performed concurrently (or at least partially concurrently).

Figure 6:
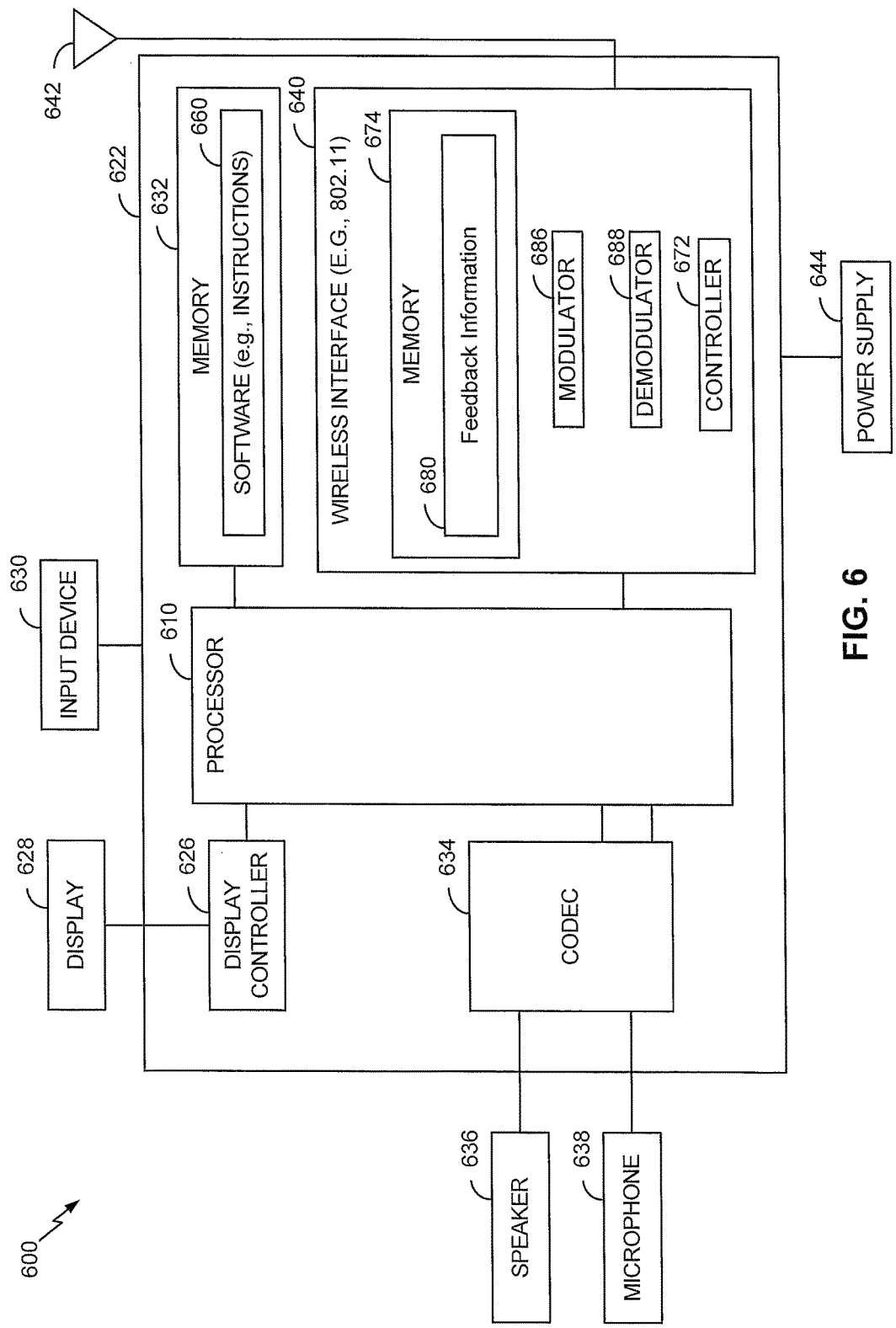
FIG. 6 is a diagram of a wireless device that is operable to support various embodiments of one or more methods, systems, apparatuses, and/or computer-readable media disclosed herein.

Referring to FIG. 6, a block diagram of a particular illustrative embodiment of a wireless communication device is depicted and generally designated 600. The device 600 may be a wireless electronic device and may include a processor 610, such as a digital signal processor (DSP), coupled to a memory 632. In an illustrative embodiment, the device 600 may the first device 110 of FIG. 1, one of the devices 120, 130, or 140 of FIG. 1, or one of the mobile stations 145 of FIG. 1.

The processor 610 may be configured to execute software 660 (e.g., a program of one or more instructions) stored in the memory 632. Additionally or alternatively, the processor 610 may be configured to implement one or more instructions stored in a memory 674 of a wireless interface 640, as described further herein. In a particular embodiment, the processor 610 may be configured to operate in accordance with one or more of operations or methods described with reference to FIGS. 1-5.

A wireless interface 640 may be coupled to the processor 610 and to an antenna 642 such that wireless data received via the antenna 642 and the wireless interface 640 may be provided to the processor 610. For example, the wireless interface 640 may include or correspond to the wireless interface 115 of FIG. 1 or the wireless interface 125 of FIG. 1. The wireless interface 640 may include the memory 674 and a controller 672. The memory 674 may include feedback information 680 (e.g., the feedback information 113 or 123 of FIG. 1). In a particular embodiment, the wireless interface 640 may also include a modulator 686 and a demodulator 688 for uplink and downlink communication, respectively.

The controller 672 may be configured to interface with the processor 610 to execute one or more instructions stored in the memory 674. The controller 672 may also be configured to interface with the processor 610 to execute the modulator 686 and/or the demodulator 688. Additionally or alternatively, the controller 672 may include a processor configured to execute one or more of the instructions stored in the memory 674. The wireless interface 640 and/or the processor 610 may also be configured to perform encoding and decoding operations, such as fast Fourier transform (FFT) and inverse FFT (IFFT) operations, beamforming, channel measurement, etc.

In a particular embodiment, the processor 610, the display controller 626, the memory 632, the CODEC 634, and the wireless interface 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the antenna 642, and the power supply 644 are external to the system-on-chip device 622. However, each of the display device 628, the input device 630, the speaker 636, the microphone 638, the antenna 642, and the power supply 644 can be coupled to one or more components of the system-on-chip device 622, such as one or more interfaces or controllers.

One or more of the disclosed embodiments may be implemented in a system or an apparatus, such as the device 600, that may include a communications device, a fixed location data unit, a mobile location data unit, a mobile phone, a cellular phone, a satellite phone, a computer, a tablet, a portable computer, or a desktop computer. Additionally, the device 600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-6 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

In conjunction with the described embodiments, an apparatus includes means for generating an ACK packet at a second device of a wireless network having a plurality of devices configured to communicate using a beamforming technique. The ACK packet includes feedback information that is useable to precode data for beamformed transmission to the second device. For example, the means for generating may include the processor 121, the channel measurement module 124, the wireless interface 125, the processor 610, the wireless interface 640 (or a component thereof), another device configured to generate a packet, or any combination thereof. The apparatus also includes means for sending the ACK packet from the second device to a first device of the wireless network. For example, the means for sending may include the wireless interface 125, the wireless interface 640 (or a component thereof), the antenna 642, another device configured to send a packet, or any combination thereof.

Another apparatus includes means for sending a trigger packet from a first device of a wireless network to a plurality of second devices of the wireless network. The wireless network has a plurality of devices configured to communicate using a beamforming technique. The trigger packet includes trigger data configured to cause the plurality of second devices to perform channel measurement based on the trigger data. In a particular embodiment, the trigger packet includes at least one LTF that follows a data portion of the packet. For example, the means for sending may include the wireless interface 115, the wireless interface 640 (or a component thereof), the antenna 642, another device configured to send a packet, or any combination thereof. The apparatus also includes means for receiving feedback information from each of the plurality of second devices in response to the trigger packet. For example, the means for receiving may include the wireless interface 115, the wireless interface 640 (or a component thereof), the antenna 642, another device configured to receive data, or any combination thereof.

Another apparatus includes means for receiving at a second device of a wireless network a trigger packet from a first device of the wireless network. The wireless network has a plurality of devices configured to communicate using a beamforming technique. For example, the means for receiving may include the wireless interface 125, the wireless interface 640 (or a component thereof), the antenna 642, another device configured to receive a packet, or any combination thereof. The apparatus also includes means for performing channel measurement in response to receiving the trigger packet, where the channel measurement is performed based on trigger data included in the trigger packet. For example, the means for performing channel measurement may include the processor 121, the channel measurement module 124, the wireless interface 125, the processor 610, the wireless interface 640 (or a component thereof), another device configured to perform channel measurement, or any combination thereof. The apparatus further includes means for sending a feedback report to the first device, where the feedback report includes feedback information based on the channel measurement. For example, the means for sending may include the wireless interface 125, the wireless interface 640 (or a component thereof), the antenna 642, another device configured to send data, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:

sending, from an access point of a wireless network to a first station of a plurality of stations of the wireless network, a packet including a preamble, a data portion, and trigger data, the preamble preceding the data portion in the packet, the data portion preceding the trigger data in the packet, the trigger data configured to cause the first station to perform a channel measurement in response to receiving the packet, wherein the trigger data comprises non-precoded, omni-directional data;

receiving, at the access point from the first station and after sending the packet, a request to join a beamforming group of the wireless network; and receiving, at the access point from the first station, feedback information that includes channel state information associated with the trigger data.

2. The method of claim 1, wherein the trigger data is distinct from the preamble, and wherein the first station joins the beamforming group based on the request.

3. The method of claim 1, wherein the feedback information is received from the first station without polling individual stations of the plurality of stations for feedback information, wherein the access point sends beamformed data to one or more of the plurality of stations, and wherein at least one of the plurality of stations comprises a mobile station configured to receive the beamformed data from the access point.

4. The method of claim 1, wherein the trigger data includes at least one omni-directional long training field (LTF).

5. The method of claim 1, wherein the packet comprises a multi-user multiple-input-multiple-output (MU-MIMO) packet.

6. The method of claim 1, wherein the packet comprises a clear to transmit (CTX) packet or a beacon frame.

7. The method of claim 1, wherein the preamble of the packet indicates that the trigger data is included in the packet, and wherein the preamble comprises a high efficiency Wi-Fi (HEW) preamble.

8. The method of claim 1, wherein the packet identifies at least one station of the plurality of stations, identifies the access point as a source of the packet, or both.

9. The method of claim 1, further comprising sending at least one multi-user multiple input multiple-output (MU-MIMO) packet to the plurality of stations, wherein the at least one MU-MIMO packet includes data for a particular station of the plurality of stations, wherein the data for the particular station is precoded based on particular feedback information received from the particular station.

10. The method of claim 5, wherein the wireless network operates in accordance with an Institute of Electrical and Electronics Engineers (IEEE) 802.11 high efficiency Wi-Fi (HEW) standard, and wherein the packet comprises a HEW MU-MIMO packet.

11. The method of claim 1, wherein the feedback information is included in a multi-user multiple-input-multiple-output (MU-MIMO) packet or an orthogonal frequency-division multiple access (OFDMA) packet that includes second feedback information from at least one other station of the plurality of stations.

12. An apparatus comprising:

a transmitter of an access point of a wireless network, the transmitter configured to send a packet to a plurality of stations of the wireless network, the access point and each station of the plurality of stations configured to communicate using a beamforming technique, the packet including a preamble, a data portion, and trigger data, the preamble preceding the data portion in the packet, the data portion preceding the trigger data in the packet, the trigger data configured to cause a first station of the plurality of stations to perform a channel measurement in response to receiving the packet, wherein the trigger data comprises non-precoded, omni-directional data; and a receiver of the access point configured to:

receive, from the first station and after sending the packet, a request to join a beamforming group of the wireless network; and receive, from the first station, feedback information that includes channel state information associated with the trigger data.

13. The apparatus of claim 12, wherein the transmitter is further configured to send precoded data to the first station, wherein the precoded data is precoded based on the channel state information, and wherein the feedback information is received from the first station without polling individual stations of the plurality of stations for feedback information.

14. The method of claim 1, wherein the trigger data is associated with causing a second station of the plurality of stations to bypass channel measurement operations associated with the packet based on an indication that additional data for the second station is not included in a packet subsequent to the packet.

15. The method of claim 1, further comprising:

sending a second packet from the access point of a wireless network to the plurality of stations of the wireless network, the second packet including second trigger data that is associated with causing the first station of the plurality of stations to perform a second channel measurement associated with the second packet, wherein the second trigger data includes non-precoded data; and receiving second feedback information from the first station in response to sending the second packet.

16. The method of claim 15, wherein the second feedback information comprises a differential feedback report indicating a change in the channel measurement based on the feedback information.

17. The method of claim 1, further comprising:

precoding data based on the channel state information; and sending the precoded data from the access point to the first station.

18. The apparatus of claim 12, wherein the packet corresponds to a multi-user multiple-input multiple-output (MU-MIMO) data packet that includes precoded data for a subset of stations of the plurality of stations, and wherein the first station is not an intended recipient of the precoded data.

19. The apparatus of claim 12, wherein the trigger data is not located in the preamble of the packet, and wherein the trigger data is not beamformed.

20. The apparatus of claim 12, wherein the channel state information is measured by the first station at a time prior to a time of receipt of the request to join the beamforming group.

21. The apparatus of claim 12, wherein the preamble comprises a high efficiency Wi-Fi (HEW) preamble.

22. An apparatus comprising:

a receiver of a station of a wireless network, the receiver configured to receive a packet from an access point of the wireless network, the station and the access point configured to communicate using a beamforming technique, the packet including a preamble and trigger data, wherein the trigger data comprises non-precoded, omni-directional data;

a processor of the station, the processor configured to initiate performance of a channel measurement in response to receipt of the trigger data at the receiver; and a transmitter of the station, the transmitter configured to, after receipt of the packet and after performance of the channel measurement:
send a request to join a beamforming group associated with the access point; and
send feedback information to the access point after sending the request, the feedback information generated based on the channel measurement, wherein the channel measurement is performed in response to receiving the trigger data and at a time that is prior to a time of sending the request to join the beamforming group.

23. The apparatus of claim 22, wherein the transmitter is further configured to send second feedback information to the access point, wherein the second feedback information corresponds to a differential feedback report, and wherein the differential feedback report is sent in response to determining that the access point has data to send to the station based on a second packet and determining that a change in the channel measurement from a prior channel measurement is greater than or equal to a threshold.

24. The apparatus of claim 22, wherein the packet comprises a multi-user multiple-input-multiple-output (MU-MIMO) packet, a clear to transmit (CTX) packet or a beacon frame, and wherein the packet does not include a null data packet frame or null data packet announcement frame.

25. A method comprising:
receiving a packet at a station of a wireless network from an access point of the wireless network, the packet including a preamble and trigger data, the trigger data associated with causing the station to perform a channel measurement, wherein the trigger data comprises non-precoded, omni-directional data;
sending, from the station to the access point, a request to join a beamforming group associated with the access point; and
sending, from the station to the access point, feedback information generated based on the channel measurement performed in response to receiving the packet and at a time that is prior to a time of sending the request to join the beamforming group, wherein the channel measurement is initiated based on the trigger data.

26. The method of claim 25, further comprising joining the beamforming group after sending the request, wherein a data portion of the packet precedes the trigger data in the packet.

27. The method of claim 25, further comprising performing the channel measurement based on an indication that additional data for the station is included in a subsequent packet.

28. The method of claim 25, wherein the feedback information is included in multi-user multiple-input-multiple-output (MU-MIMO) packet, an orthogonal frequency-division multiple access (OFDMA) packet, or a power-save (PS) poll frame.

29. The method of claim 1, further comprising:
generating a precoding matrix based on the feedback information;
precoding at least a portion of a multiple-input-multiple-output (MU-MIMO) packet based on the precoding matrix; and
sending the MU-MIMO packet to the plurality of stations of the wireless network.

* * * * *